(12) United States Patent
Dorsey (10) Patent No.: US 8,810,734 B2
(45) Date of Patent: *Aug. 19, 2014

(54) BI-MODAL SWITCHING FOR CONTROLLING DIGITAL TV APPLICATIONS ON VIDEO DEVICES

(75) Inventor: Eric Andrew Dorsey, Palo Alto, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 1320 days.

This patent is subject to a terminal disclaimer.

(21) Appl. No.: 11/991,199

(22) PCT Filed: Jun. 29, 2006

(86) PCT No.: PCT/US2006/025740
§ 371 (c)(1),
(2), (4) Date: Feb. 27, 2008

(87) PCT Pub. No.: WO2007/027293
PCT Pub. Date: Mar. 8, 2007

(65) Prior Publication Data
US 2009/0059091 A1     Mar. 5, 2009

Related U.S. Application Data

(60) Provisional application No. 60/713,034, filed on Aug. 31, 2005.

(51) Int. Cl.
*H04N 5/44* (2011.01)
*H04N 5/64* (2006.01)
*G06F 3/048* (2013.01)
*H04N 21/485* (2011.01)
*H04N 21/478* (2011.01)

(52) U.S. Cl.
CPC ............... *H04N 5/64* (2013.01); *H04N 21/485* (2013.01); *H04N 5/4401* (2013.01); *H04N 21/478* (2013.01); *G06F 3/048* (2013.01)
USPC ........... 348/734; 348/719; 348/742; 348/840; 348/838; 348/602; 348/558; 348/549; 348/502; 348/503; 348/370; 348/366; 348/271; 348/269; 348/259; 348/211.99; 348/211.1; 348/211.2; 348/113; 348/70; 348/68; 715/716; 715/717; 715/718; 715/719; 715/720; 715/721; 715/722; 725/45; 725/47; 725/52

(58) Field of Classification Search
USPC ............ 348/734, 838, 836, 375, 558, 211.99, 348/211.1, 211.2, 719, 742, 840, 602, 549, 348/503, 502, 370, 366, 271, 269, 259, 113, 348/70, 60; 725/45, 47, 52; 715/716–722
See application file for complete search history.

(56) References Cited

U.S. PATENT DOCUMENTS 5,157,496 A * 10/1992 Kurosawa ....................... 725/56
(Continued)

FOREIGN PATENT DOCUMENTS

CN     1346569 A     4/2002
(Continued)

OTHER PUBLICATIONS
Search report dated Nov. 27, 2006.
(Continued)

*Primary Examiner* — Jefferey Harold
*Assistant Examiner* — Mustafizur Rahman
(74) *Attorney, Agent, or Firm* — Robert D. Shedd; Reitseng Lin (57) ABSTRACT

A portable digital television (DTV) comprises a processor, a channel and volume changing button arrangement, and a navigational button arrangement. Either or both button arrangements can be used in at least a bi-modal operation. In a first mode of operation, the button arrangements provide their normal functions, and in the second mode of operation, the button arrangements provide an interactive application interface to the user. Preferably, one of the two button arrangements is selected for the bi-modal operation. The selected button arrangement is associated with at least an optical element for lighting the button arrangement. The controller operates the optical element such that the selected button arrangement has one color in one mode of operation and has a different color in the other mode of operation.

19 Claims, 11 Drawing Sheets

(56) References Cited

U.S. PATENT DOCUMENTS

| | | |
|---|---|---|
| 5,894,276 A | 4/1999 | Altidor et al. |
| 5,950,809 A | 9/1999 | Andre |
| 6,310,609 B1 | 10/2001 | Morgenthaler |
| 6,348,932 B1 | 2/2002 | Nishikawa et al. |
| 6,519,009 B1* | 2/2003 | Hanaya et al. .............. 348/564 |
| 6,629,077 B1 | 9/2003 | Arling et al. |
| 6,761,462 B2 | 7/2004 | Yoshida |
| 6,771,938 B2 | 8/2004 | Lustila et al. |
| D497,618 S | 10/2004 | Andre et al. |
| 6,813,147 B2 | 11/2004 | Jeong |
| 6,906,701 B1 | 6/2005 | Oueslati et al. |
| 7,461,350 B2* | 12/2008 | Salo et al. .................... 715/773 |
| 2002/0024505 A1 | 2/2002 | Eftekhari |
| 2002/0025829 A1* | 2/2002 | Kitatani ....................... 455/550 |
| 2002/0168947 A1* | 11/2002 | Lemley ......................... 455/90 |
| 2002/0184626 A1 | 12/2002 | Darbee et al. |
| 2003/0034878 A1* | 2/2003 | Hull et al. .................. 340/5.61 |
| 2003/0079227 A1 | 4/2003 | Knowles et al. |
| 2003/0093812 A1 | 5/2003 | Chang et al. |
| 2004/0021694 A1 | 2/2004 | Doar |
| 2004/0022047 A1* | 2/2004 | Okayasu ......................... 362/23 |
| 2004/0046741 A1 | 3/2004 | Low et al. |
| 2004/0055446 A1 | 3/2004 | Robbin et al. |
| 2004/0056985 A1* | 3/2004 | Seong .......................... 348/838 |
| 2004/0068740 A1* | 4/2004 | Fukuda et al. ................ 725/45 |
| 2004/0090556 A1* | 5/2004 | Kamieniecki et al. ........ 348/558 |
| 2004/0107444 A1 | 6/2004 | Moon |
| 2004/0119601 A1* | 6/2004 | Colorado et al. ........ 340/815.4 |
| 2004/0125078 A1 | 7/2004 | Nishimori et al. |
| 2004/0158859 A1* | 8/2004 | Aoyama et al. ................ 725/45 |
| 2004/0192255 A1 | 9/2004 | Nakamura |
| 2004/0224638 A1 | 11/2004 | Fadell et al. |
| 2004/0268391 A1* | 12/2004 | Clercq et al. .................... 725/37 |
| 2005/0018073 A1* | 1/2005 | Pilu ............................... 348/375 |
| 2005/0088315 A1 | 4/2005 | Klein et al. |
| 2005/0141065 A1* | 6/2005 | Masamoto ....................... 359/15 |
| 2005/0285547 A1* | 12/2005 | Piepgras et al. ............... 315/294 |
| 2006/0136773 A1 | 6/2006 | Kespohl et al. |
| 2006/0149809 A1* | 7/2006 | Salo et al. ..................... 709/203 |

FOREIGN PATENT DOCUMENTS

| | | |
|---|---|---|
| CN | 1480825 A | 3/2004 |
| EP | 0 849 948 A2 | 6/1998 |
| EP | 1 351 217 A1 | 10/2003 |
| EP | 1463078 | 9/2004 |
| GB | 2407186 A | 4/2005 |
| JP | 10-112886 | 4/1998 |
| JP | 10142651 | 5/1998 |
| JP | 2001-331253 | 11/2001 |
| JP | 20011333291 | 11/2001 |
| JP | 2001-359179 A | 12/2001 |
| JP | 2003-131783 | 5/2003 |
| JP | 2004-38897 | 2/2004 |
| JP | 200422874 | 8/2004 |
| JP | 2004295355 | 10/2004 |
| JP | 2004-336489 | 11/2004 |
| JP | 2005-6144 A | 1/2005 |
| JP | 200545350 | 2/2005 |
| JP | 2005134998 | 5/2005 |
| KR | 20030060531 | 7/2003 |
| KR | 20050016149 | 2/2005 |
| WO | 97/49044 | 12/1997 |
| WO | 00/52930 | 9/2000 |
| WO | 0078050 A1 | 12/2000 |
| WO | 01/17255 A1 | 3/2001 |
| WO | 0203187 A2 | 1/2002 |
| WO | 2005/069609 A2 | 7/2005 |

OTHER PUBLICATIONS

Non-final Office Action dated Jul. 18, 2011, 18 pgs.
Final rejection dated Dec. 22, 2011, 10 pgs.
Final Rejection dated Aug. 30, 2012, U.S. Appl. No. 11/795,537, 19 pgs.
Office Action for U.S. Appl. No. 11/795,537 dated Apr. 12, 2012.
Officce Action for U.S. Appl. No. 11/795,537 dated Jun. 28, 2013.
Office Action for U.S. Appl. No. 11/795,537 dated Oct. 21, 2013.
Notice of Allowance for U.S. Appl. No. 11/795,537 dated Feb. 3, 2014.
Notice of Allowance for U.S. Appl. No. 11/795,537 dated May 23, 2014.

* cited by examiner

Navigational Mode (white colors)

FIG. 10

Chromatic Mode (non-white colors)

FIG. 11

BI-MODAL SWITCHING FOR CONTROLLING DIGITAL TV APPLICATIONS ON VIDEO DEVICES

CROSS-REFERENCE TO RELATED APPLICATIONS

This application claims the benefit, under 35 U.S.C. §365 of International Application PCT/US2006/025740, filed Jun. 29, 2006, which was published in accordance with PCT Article 21(2) on Mar. 8, 2007 in English and which claims the benefit of U.S. provisional patent application No. 60/713,034, filed Aug. 31, 2005.

BACKGROUND OF THE INVENTION

The present invention generally relates to user interfaces and, more particularly, to a user interface for a hand-held video device.

In a television system conforming to the Digital Video Broadcasting (DVB-T) Standard found in Europe (e.g., see ETSI EN 300 744 and other associated documents) interactive applications may be present. In this regard, a remote control for a digital television (DTV) typically comprises a set of navigation keys and a set of function keys. The set of navigation keys, or buttons, are used to traverse an electronic programming guide (EPG) and/or a menu tree displayed on the DTV by, for example, moving a pointer in a direction, and typically comprises five buttons representing such common operations as "up", "down", "right", "left" and "select". In comparison, the function keys are used for the interactive application and typically comprise at least four buttons, each button associated with a particular color. For example, one button is colored red, another green, a third blue and the fourth yellow. (It should be noted that a fifth button is reserved for future use and is denoted by the color purple.) As such, the interactive application may provide "soft labels" on the picture displayed on the DTV, each label textually describing a different function and having one of the four colors. For example, an interactive application may cause to be displayed a soft label with the text "go back" and having a red background. A user would then know that pressing the red-colored function key on the remote control would correspond to performing the "go back function" for the interactive application.

SUMMARY OF THE INVENTION

I have observed that the use of a set of navigation keys, a set of channel and volume changing keys, and a set of function keys in a DTV environment presents a problem in the construction of a portable DTV that supports interactive applications. In particular, the portable DTV must either provide enough physical space for at least fourteen buttons somewhere on the portable DTV (five buttons for the navigation interface, four buttons for channel and volume changing, and five buttons for the interactive application interface), or require packaging of a remote control (with the above-noted requisite number of buttons) along with the portable DTV. Therefore, and in accordance with the principles of the invention, a navigational button arrangement, or channel and volume changing button arrangement or both have at least a bi-modal operation. In one mode of operation, the navigational button arrangement or the channel and volume changing button arrangement provides its normal function. For example, if the navigational button arrangement is used for a bi-modal operation, the normal function is to traverse a guide and/or menu presented on the DTV, and if the channel and volume changing button arrangement is used for a bi-modal operation, the normal function is to change a channel selection or to change a volume setting. In another mode of operation, the button arrangement used for bi-modal operation provides an interactive application mode for interacting with a DTV application presented to the user. Thus, the portable DTV utilizes nine buttons to provide the navigational interface, the channel and volume changing, and the interactive application interface instead of the above-noted fourteen buttons.

In an embodiment of the invention, an apparatus comprises a device for generating a control signal, means for illuminating the device, and a controller having a first mode of operation wherein the controller interprets the control signal as a first signal, and having a second mode of operation wherein the controller activates the illuminating means and interprets the control signal as a second signal different from the first signal for selecting a first predefined link displayed on a display coupled to the apparatus.

In the first mode of operation, the illuminating means is operated such that the device has a first color, and in the second mode of operation, the illuminating means is operated such that the device has a second color different from the first color.

In another embodiment, in the first mode of operation, the controller interprets the control signal either as moving a pointer on the display, incrementing a channel selection, decrementing a channel selection, increasing a volume setting, or decreasing a volume setting.

DETAILED DESCRIPTION

Other than the inventive concept, the elements shown in the figures are well known and will not be described in detail. Also, familiarity with digital television-based systems is assumed and is not described in detail herein. For example, other than the inventive concept, digital-TV bearing modulated signals, symbol constellations, carrier recovery, interpolation, phase-locked loops (PLLs), a radio-frequency (RF) front-end, or receiver section, such as a low noise block downconverter, formatting and encoding methods (such as Moving Picture Expert Group (MPEG)-2 Systems Standard (ISO/IEC 13818-1)) for generating transport bit streams, decoding methods such as log-likelihood ratios, soft-inputsoft-output (SISO) decoders, Viterbi decoders, stored-program controlled processors and buttons for providing a user interface, are well-known and not described herein. In addition, the inventive concept may be implemented using conventional programming techniques, which, as such, will not be described herein. Finally, like-numbers on the figures represent similar elements and at least some of the figures simplify the processing representation and are not drawn to scale.

Figure 1:
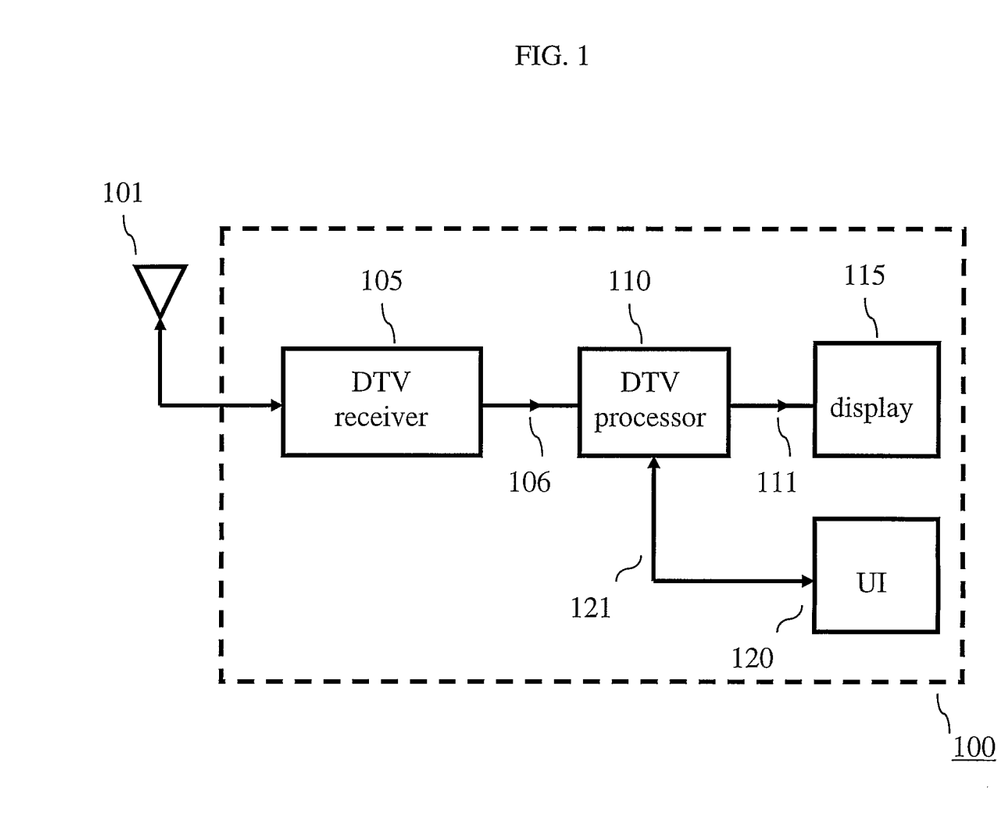
FIG. 1 shows an illustrative portable DTV embodying the principles of the invention.

An illustrative portable DTV 100 in accordance with the principles of the invention is shown in FIG. 1. Portable DTV 100 comprises antenna 101, DTV receiver 105, DTV processor 110, display 115 and user interface (UI) 120. Illustratively, portable DTV 100 conforms to the earlier-mentioned European DVB-T standard. In this regard, DTV receiver 105 receives a DTV signal, via antenna 101. DTV receiver 105 processes the received signal to provide a down-converted signal 106 to DTV processor 110. The latter further processes the down-converted signal to recover therefrom a digital service such as a digital video signal 111 for application to display 115 for viewing thereon by a user. Portable DTV 100 is controlled by UI 120, via signaling path 121, which provides the ability for a user to, e.g., turn-on and off the device, select channels, adjust volume, traverse a graphical user interface (GUI) as represented by an electronic program guide (EPG) and/or a menu (such as for setting DTV parameters (e.g., video, audio, etc.)) presented on display 115 and provide interactive application data, etc. With regard to interactive application data, DTV processor 110 includes a memory (not shown) for storing therein an interactive application program downloaded via DTV receiver 105. Upon execution by DTV processor 110, the interactive application program provides an interactive application to the user. Known interactive applications are, e.g., weather, news, traffic and games (e.g., Tetris). An interactive application may be associated with a specific channel (e.g., a game channel) or with a program that is currently being viewed. For example, a sports program may also display a colored function key on the screen that, when selected by the user, provides, e.g., additional team information. It should be noted that DTV processor 110 is representative of a processing function and may be implemented in one, or more, stored-program controlled processors (e.g., a microprocessor).

Figure 2:
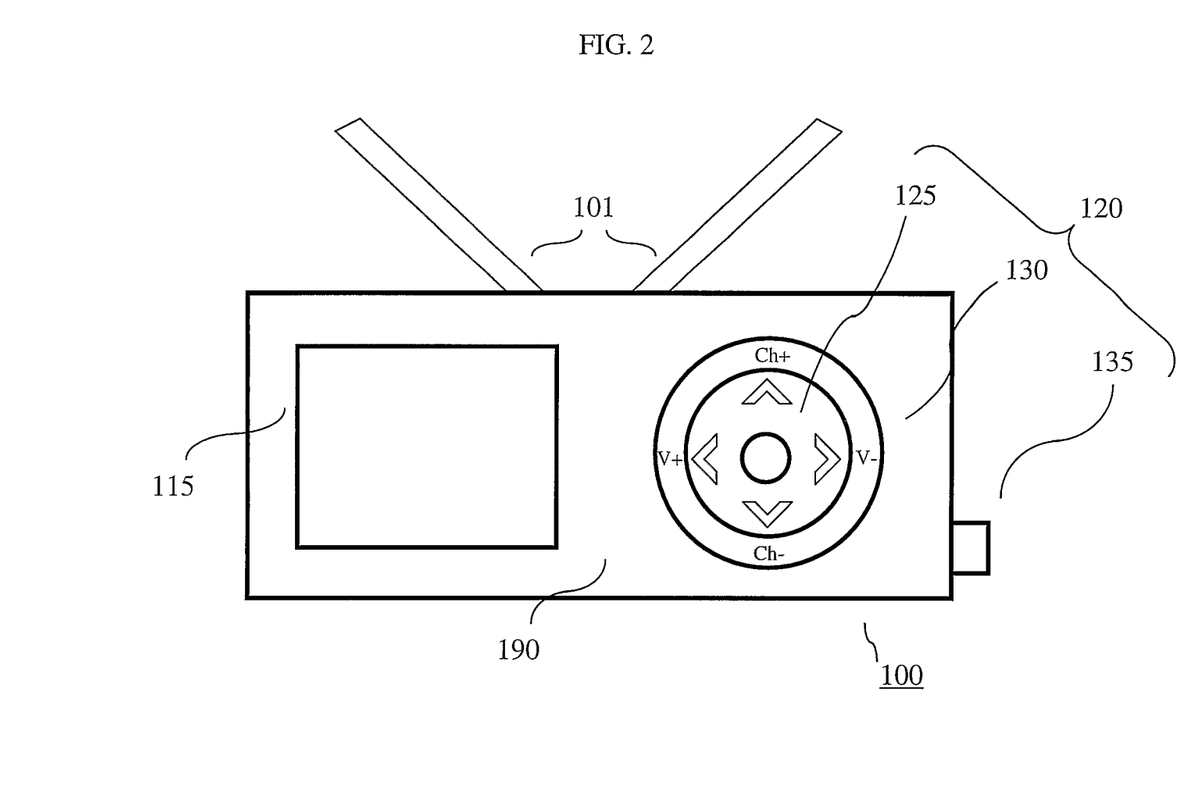
FIG. 2 shows an illustrative front view of a portable DTV embodying the principles of the invention.

Turning now to FIG. 2, an illustrative front view of portable DTV 100 is shown. It should be noted that this view is only illustrative, is not to scale, and is merely used to highlight the principles of the invention. Portable DTV 100 is contained within a housing 190. As can be observed from FIG. 2, housing 190 provides support for display 115, user interface 120 and antenna 101. User interface 120 comprises at least a navigational button arrangement 125, a button arrangement 130 and a mode button 135. Button arrangement 130 illustratively provides the ability for a user to change channels and adjust volume. (Button arrangement 130 may be referred to as channel and volume changing button arrangement 130.) This is shown in FIG. 2 by the illustrative use of the labels "Ch+" and "Ch−" as indicating the buttons used for incrementing and decrementing a current channel selection; and by the illustrative use of the labels "V+" and "V−" as indicating the buttons used for increasing and decreasing a current volume setting. Although not necessary for the inventive concept, other buttons may be present, e.g., a power button, but these are not relative to the inventive concept. In accordance with the principles of the invention, navigational button arrangement 125 or button arrangement 130 or both have at least two modes of operation: a normal mode of operation and an interactive application mode of operation (also referred to herein as a chromatic mode of operation). For example, in the normal mode of operation, the illustrated buttons in navigational button arrangement 125 are used as navigation buttons, and the illustrated buttons in button arrangement 130 are used for changing a channel selection and changing a volume setting. For the sake of convenience, the normal mode of operation for navigational button arrangement 125 is referred to as the navigational mode of operation in the description that follows.

Figure 3:
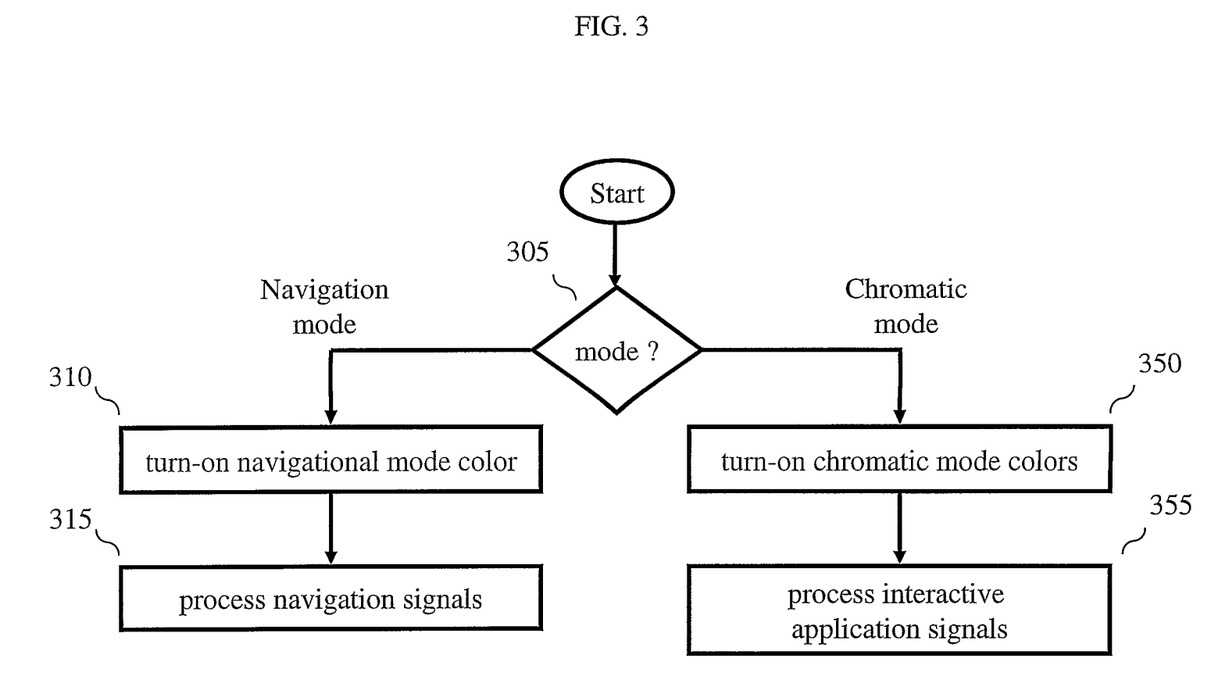
FIG. 3 shows an illustrative flow chart in accordance with the principles of the invention.

Reference should now be made to FIG. 3, which illustrates an illustrative flow chart in accordance with the principles of the invention for providing a navigational button arrangement with at least two modes of operation. In step 305, DTV processor 110 sets the mode of portable DTV 100. For example, DTV processor 110 may use mode button 135 of FIG. 2 for setting the mode. In particular, mode button 135 provides an indication of at least two states. One state is associated with the navigational mode of operation and the other state is associated with the interactive application mode of operation. DTV processor 110 will switch modes simply be detecting the current state of mode button 135. As such, a user can cause DTV processor 110 to switch the modes by simply pressing mode button 135. When the navigational mode is set, DTV processor 110 executes steps 310 and 315. In step 310, DTV processor 110 turns on the navigational mode color (described further below) and, in step 315, processes any signals from navigational button arrangement 125 as navigation signals. On the other hand, when the interactive application mode is set, DTV processor 110 executes steps 350 and 355. In step 350, DTV processor 110 turns on the interactive application mode colors (also referred to herein as the chromatic mode colors) (described below) and, in step 355, processes any signals from navigational button arrangement 125 as interactive application signals and passes them to the particular interactive application program. Thus, portable DTV 100 utilizes five buttons to provide both the navigational interface and the interactive application interface instead of the earlier-noted ten buttons.

Figure 4:
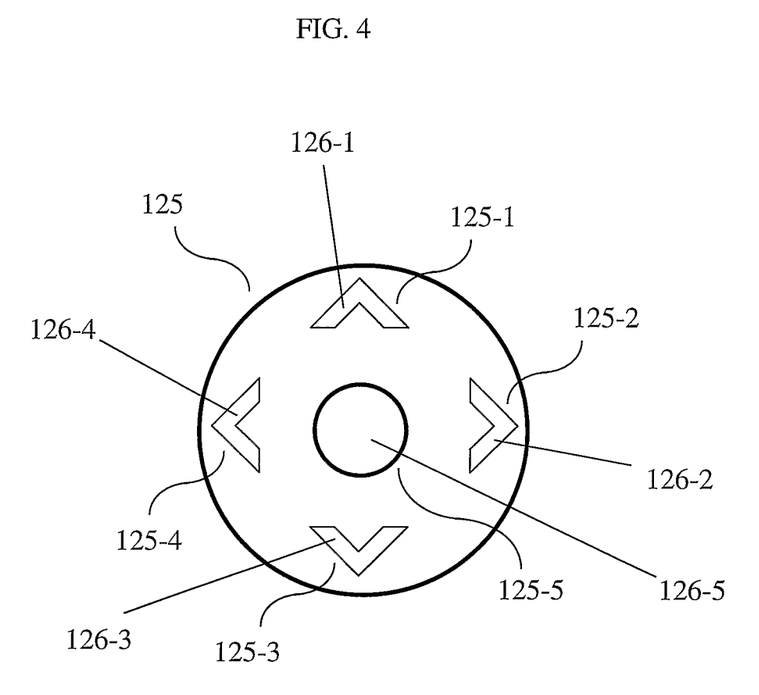
FIG. 4 shows an illustration of navigational button arrangement 125 in the navigational mode in accordance with the principles of the invention.

The navigational mode for navigational button arrangement 125 is illustrated in FIG. 4. Portions of navigational button arrangement 125 comprise in effect five buttons: an up button, a right button, a down button, a left button and a select button. These are illustrated in FIG. 4 by corresponding portions 125-1, 125-2, 125-3, 125-4 and 125-5 of navigational button arrangement 125. These portions of navigational button arrangement 125 are also referred to herein as up button 125-1, right button 125-2, down button 125-3, left button 125-4 and select button 125-5. Each button portion comprises at least a partially optically transparent portion, as represented by optical portions 126-1, 126-2, 126-3, 126-4 and 126-5. For the purposes of this description the outer optically transparent portions (126-1, 126-2, 126-3 and 126-4) are in the shape of illustrative direction symbols (∧, ∨, >, <) but the inventive concept is not so limited.

Figure 5:
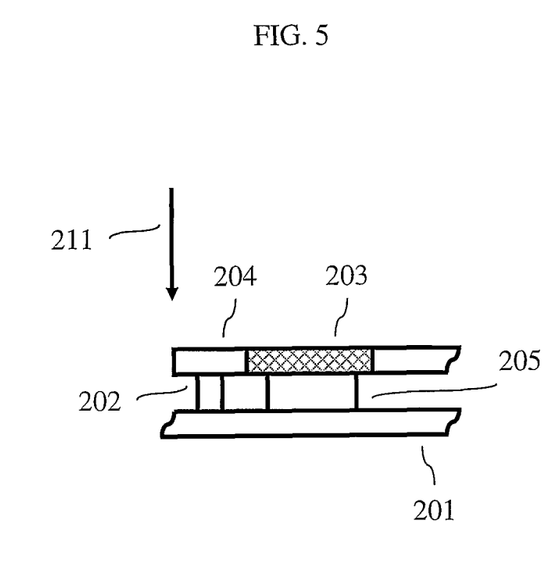
FIG. 5 shows an illustrative portion of navigational button arrangement 125.

Turning briefly to FIG. 5, a simplified form of an illustrative block diagram is shown for a portion (e.g., one button, e.g., button 125-4) of navigational button arrangement 125. Navigational button arrangement 125 comprises a circuit board 201, post element 202, optical element 205 and a cover plate 204 having at least a partially optically transparent portion 203 for emitting light from optical element 205 (e.g., corresponding to optically transparent portion 126-4 of FIG. 4), so that the corresponding button (e.g. button 125-4) appears to a user to have the same color as the light emitted from the corresponding optical element 205. Arranged on both circuit board 201 and post element 202 are corresponding electrically conductive elements (not shown) such that when cover plate 204 is depressed in the direction of arrow 211, the electrically conductive element of post element 202 makes contact with the corresponding electrically conductive element of circuit board 201 to generate an electrical signal to DTV processor 110 via signaling path 121 of FIG. 1 (not shown in FIG. 5). In addition, circuit board 201 conveys electrical signals to optical element 205 for causing optical element 205 to generate light for transmission through optically transparent portion 203. Optical element or light source 205 is controlled via signaling path 121 of FIG. 1 (not shown in FIG. 5) by DTV processor 110. In accordance with the principles of the invention, optical element 205 is a multi-color light emitting diode (LED) and is capable of providing light in at least two types of colors. For example, optical element 205 may be a bi-color LED, a tri-color LED, etc., as known in the art. For the purposes of this description it is assumed that at least one of the colors capable of being generated by optical element 205 is white.

Returning to FIG. 4, and as noted above, this figure is representative of the navigational mode of operation. In particular, each optical element of navigational button arrangement 125 is controlled to provide a white color (step 310 of FIG. 3). This is illustrated in FIG. 4 by the lack of a "fill" pattern in each of the optically transparent portions 126-1, 126-2, 126-3, 126-4 and 126-5. As such, the presence of white light associated with all of the buttons of navigational button arrangement 125 is indicative to a user that the navigational button arrangement is in the navigational mode and can be used to, e.g., change channels, adjust volume, etc. Other colors other than red, green, blue, yellow, and purple, which are used or reserved for the interactive applications, can be used to indicate that button arrangement 125 is operated in the navigational mode. Furthermore, the navigational mode can be indicated by just turning off all of the associated optical elements, which reduces the power consumption, increasing the operating period of the portable DTV 100.

Figure 6:
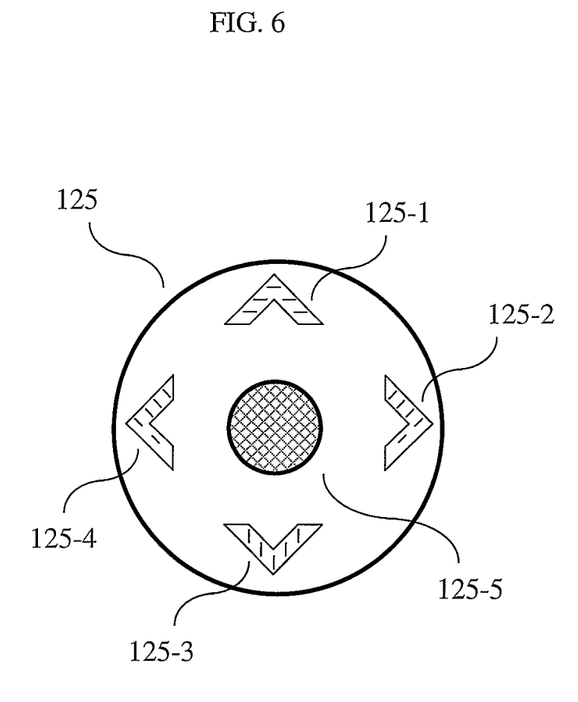
FIGS. 6, 7 and 8 show illustrations of the navigational button arrangement 125 in the interactive application mode in accordance with the principles of the invention.

Referring now to FIG. 6, the interactive application mode is illustrated. A visual comparison of FIGS. 4 and 6 shows that, in FIG. 6, patterns now exist in the optically transparent portions 126-1, 126-2, 126-3, 126-4 and 126-5. These patterns are used herein to represent a color of light other than white. In particular, each optical element of navigational button arrangement 125 is controlled to provide a different color (step 350 of FIG. 3). Illustratively, the horizontal dash "-" associated with up button 125-1 is representative of the color red; the vertical dash "|" associated with down button 125-3 is representative of the color blue, the forward slash "/" associated with right button 125-2 is representative of the color yellow, the backward slash "\" associated with left button 125-4 is representative of the color green and the cross-hatch pattern associated with select button 125-5 is representative of the color purple. (As noted above, the color purple is a reserved color for future use by interactive applications. As such, the color associated with select button 125-5 may also be kept as white, or the associated optical element may be turned off so that no light is emitted, in accordance with the principles of the invention.)

Figure 7:
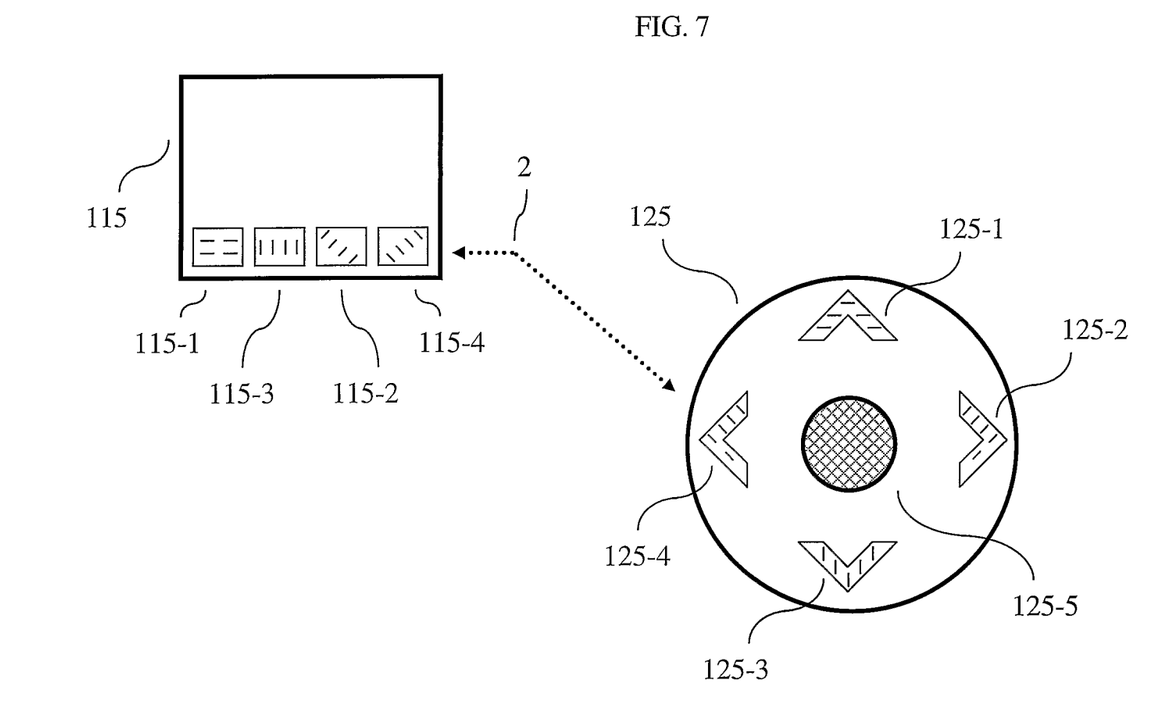

The operation of the interactive application mode is further illustrated in FIG. 7. As shown in FIG. 7, navigational button arrangement 125 is in the interactive mode as represented by the above-described "fill" characters. Also shown in FIG. 7 is an illustration of a portion of an image present on display 115 during the application mode. In particular, portions of display 115 represent functions that a user may select. (Not shown in FIG. 7 are the corresponding text labels associated with each of the functions a user may select.) Since each color icon with a corresponding text label is linked to a function, each color icon can be called a predefined link. The use of a color icon with soft text is only illustrative. Other methods, such as color hypertext and color Universal Resource Locators (URL), can be used as well. Each function is denoted by a particular color as represented by a particular "fill" character. For example, the horizontal dash "-" associated with display portion 115-1 is representative of the color red; the vertical dash "|" associated with display portion 115-3 is representative of the color blue, the forward slash "/" associated with display portion 115-2 is representative of the color yellow, and the backward slash "\" associated with display portion 115-4 is representative of the color green. In accordance with the principles of the invention, in the interactive application mode there is a correspondence between the colors shown on display 115 and the colors emitted by the optical elements of navigational button arrangement 125. Thus, when colors other than white appear next to a button, the user can detect that portable DTV 100 is in the interactive application mode and that use of the button associated with a particular color will result in that function being selected for the interactive application. For example, if display portion 115-1 also displayed a text label (not shown) entitled "go back," then the user would simply press button 125-1—also indicated in red—to select that function. As described above, if an interactive application presents less than five functions on the display for selection by the user, then correspondingly navigational button arrangement 125 may be controlled in accordance with the principles of the invention to show all the colors or, instead, only show those colors corresponding to the available interactive application functions. For example, if an interactive application only displays a red function key, then navigational button arrangement 125 may be controlled to show all of the colors (red, blue, yellow, green and purple) or, instead, navigational button arrangement 125 may be controlled such that only button 125-1 is lit with the color red. In this latter case, it is assumed that function key information is provided by the interactive application to DTV processor 110, so that DTV processor 110 can turn on the corresponding optical element with the same color as that of the displayed function. In either case, pressing the other four functions generates no effect.

Figure 8:
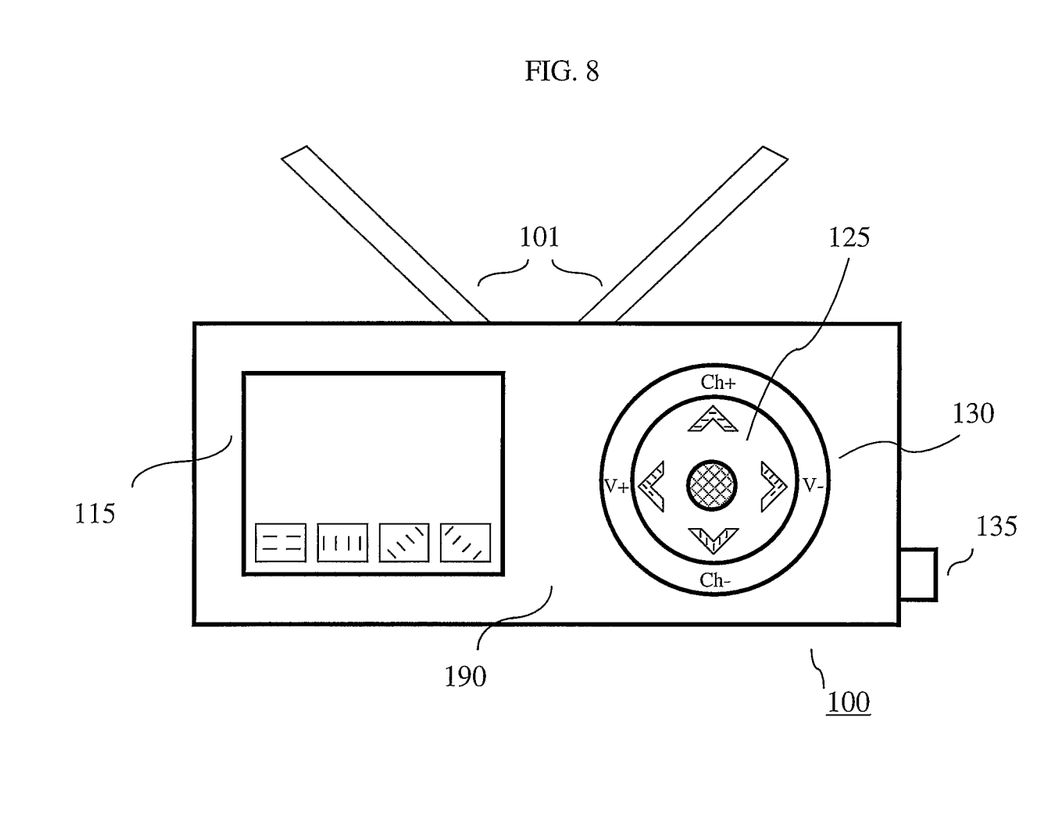
Figure 9:
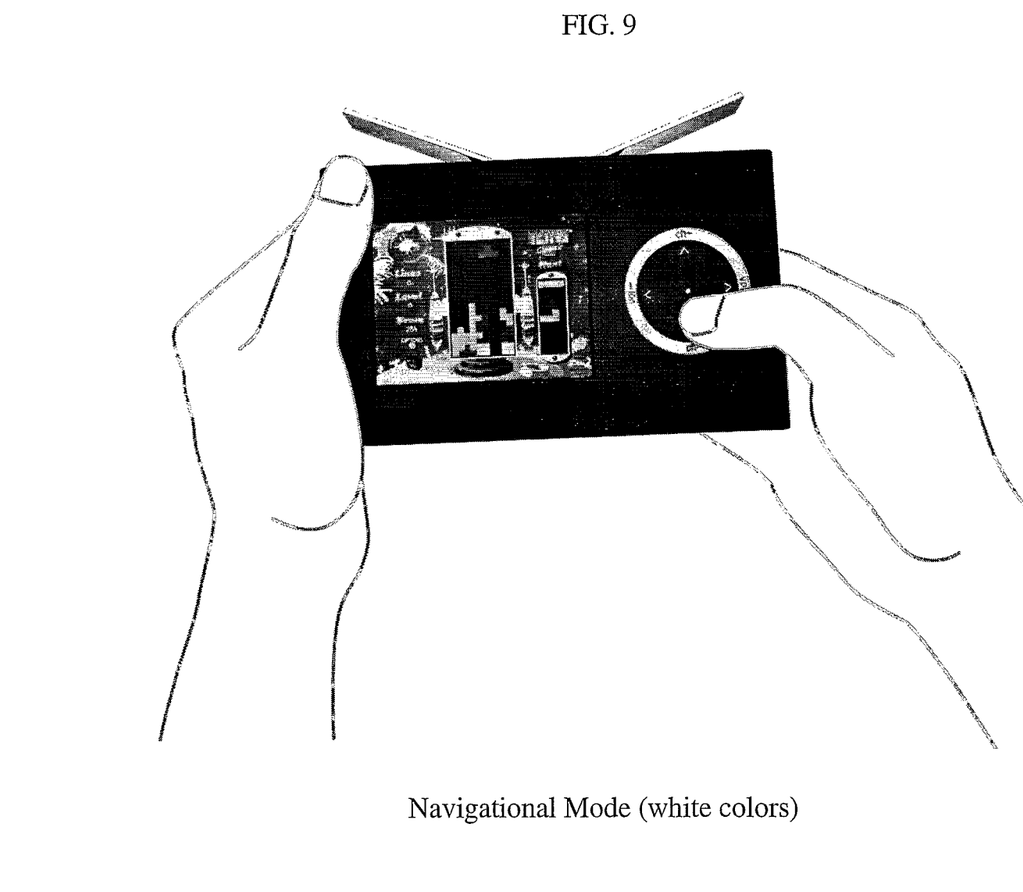
FIGS. 9 and 10 show other views of portable DTV 100 in the navigational mode and interactive application (chromatic) mode.
Figure 10:
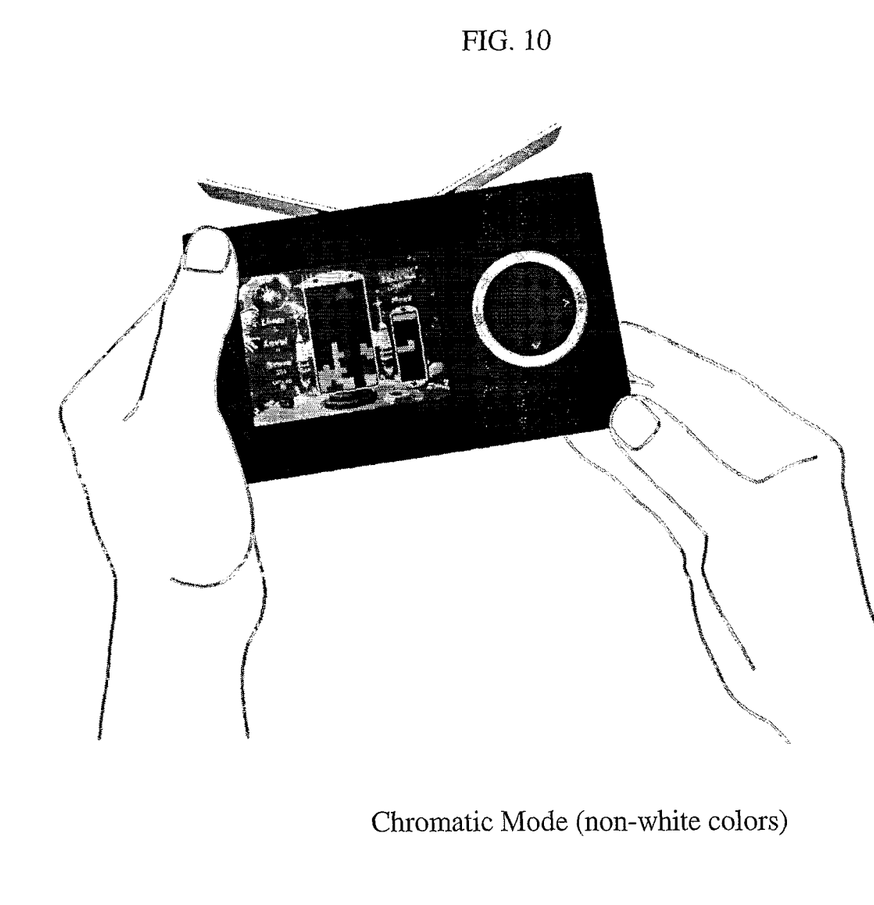

Another illustration of a front view of portable DTV 100 in the interactive application mode is shown in FIG. 8. Likewise, illustrations of user operation are shown in FIGS. 9 and 10 for the navigational mode and the interactive application mode, respectively. It should be noted that these figures are black and white reproductions of color images.

Figure 11:
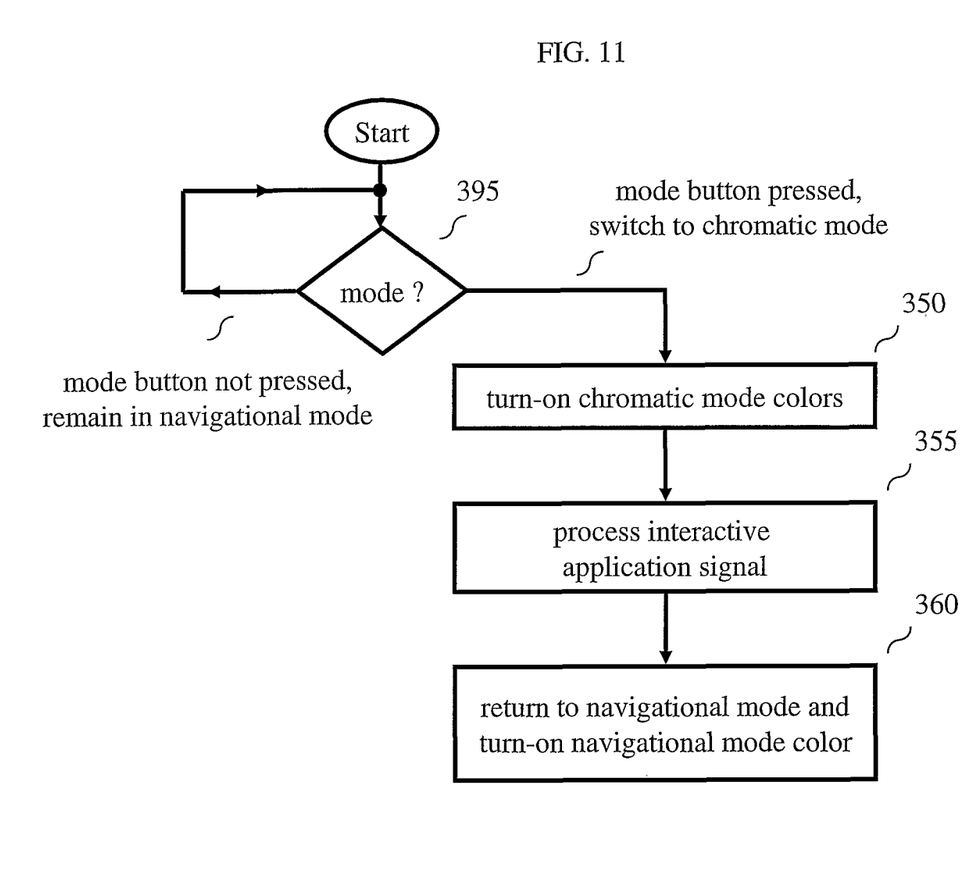
FIG. 11 shows another illustrative flow chart in accordance with the principles of the invention.

Turning now to FIG. 11, another illustrative flow chart in accordance with the principles of the invention is shown. This is an alternative method for configuring portable DTV 100 in either the navigational mode or the interactive application mode. In this example, portable DTV 100 operates in a "sticky mode." In this sticky mode, portable DTV 100 is always in the navigational mode and only switches to the interactive application mode for one key (button) press via, e.g., use of mode button 135. In particular, in step 395, portable DTV 100 checks the state of mode button 135 (e.g., via the use of a polling technique or via the use of an interrupt). If mode button 135 has been pressed, then portable DTV 100 enters the interactive application mode in step 350 and turns on the interactive application mode colors. In step 355, portable DTV 100 processes the next key stroke on navigational button arrangement 125 in the interactive application mode. Once the next key stroke has been received, portable DTV 100 returns to the navigational mode in step 360 and turns on the navigational mode colors. It should be noted that the method of FIG. 11 can be further modified to include, e.g., a "time out" feature such that if the user does not press a button within a defined period of time while in the interactive application mode then portable DTV 100 reverts back to the navigational mode.

The manner of using button arrangement 130 to provide above-described at least two modes of operation is the same as that of using navigational button arrangement 125. The button structure and the optical element structure can be the same. To avoid redundancy, only different characteristics of button arrangement 130 are described herein. Button arrangement 130 illustratively is located in an outer ring shown in FIG. 2, which is partially optically transparent (semi-reflective). The outer ring, for example, illustratively is made of plastic and painted with a paint that makes it normally look like polished aluminum. An advantage of this arrangement is that when operating in the interactive application mode, one can easily see the colored lights, i.e., the color of a button appear to a user to be the same as that of the light emitted by the corresponding optical element. The colored lights also make it difficult for a person to see the labels "Ch+," "Ch−," "V+," and "V−," which are illustratively etched into the outer ring.

If both navigational button arrangement 125 and button arrangement 135 provide the above-described at least two modes of operation, the DTV 100 provides a user interface, such as an on-screen display or another button, for a user to select which one of the two is active during, for example, a setup procedure for DTV 100. Once one of the two button arrangements is selected, the manner of operation is the same as described above. In this embodiment, nine optical elements are needed, one for each button in both button arrangements 125 and 130.

As described above, and in accordance with the principles of the invention, a navigational button arrangement or channel and volume changing button arrangement or both are used in at least two modes of operation: a normal mode of operation and an interactive application mode of operation. Thus, only four (if purple is not used) or five buttons are needed thereby reducing the amount of physical space required for a user interface on a portable digital TV. As such, the physical size of a portable DTV may be capable of further reduction since even less space is required for the user interface.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although shown as separate elements, any or all of the elements may be implemented in one or more integrated circuits (ICs) such as, e.g., a stored-program-controlled processor, e.g., a digital signal processor (DSP) or microprocessor that executes associated software, e.g., corresponding to one or more of the elements shown in FIG. 1, etc. Further, although described in the context of a portable digital television the inventive concept is also applicable to a remote control for a digital television, etc. Likewise, although a mode button was illustrated in the above description, other methods and mechanisms of setting the mode of the navigational button arrangement may be used. It is therefore to be understood that numerous modifications may be made to the illustrative embodiments and that other arrangements may be devised without departing from the spirit and scope of the present invention as defined by the appended claims.

The invention claimed is:

1. Apparatus comprising:
   first, second, third, and fourth input mechanisms for respectively generating a first, second, third, and fourth control signals;
   first, second, third, and fourth optical elements for respectively illuminating the first, second, third, and fourth input mechanisms; and
   a controller having a first mode of operation wherein the controller interprets the first, second, third, and fourth control signals as a first, second, third, and fourth signals, and having a second mode of operation wherein the controller activates the first, second, third, and fourth optical elements and interprets the first, second, third, and fourth control signals as fifth, sixth, seventh, and eighth signals for respectively selecting first, second, third, and fourth predefined links displayed on a display coupled to the apparatus;
   wherein in the second mode of operation, said first, second, third and fourth optical elements are illuminated in first, second, third, and fourth different colors respectively and said first, second, third and fourth links are displayed in said first, second, third and fourth different colors respectively and wherein when any combination of the first, second, third, and fourth predefined links is displayed on the display, the controller activates a corresponding combination of the first, second, third, and fourth optical elements to be illuminated in the respective one of the first, second third and fourth different colors, whereby the first, second, third and fourth optical elements corresponding to ones of the first, second, third and fourth links not displayed are not activated.

2. The apparatus of claim 1, wherein in the first mode of operation, the first, second, third, and fourth optical elements are turned off, and in the second mode of operation, the first, second, third, and fourth optical elements are operated to emit lights in different the colors.

3. The apparatus of claim 1, wherein in the first mode of operation, the first, second, third, and fourth optical elements are operated such that the respective first, second, third, and fourth input mechanisms have a first color, and in the second mode of operation, first, second, third, and fourth optical elements are operated such that the respective first, second, third, and fourth input mechanisms respectively have second, third, fourth, and fifth colors different from the first color.

4. The apparatus of claim 3, wherein the first, second, third, and fourth predefined links are displayed on the display respectively in the second, third, fourth, and fifth colors.

5. The apparatus of claim 3, wherein the second, third, fourth, and fifth colors respectively are red, green, blue, and yellow.

6. The apparatus of claim 5, wherein in the first mode of operation, the first, second, third, and fourth signals respectively are signals for moving a pointer on the display in: left, right, up, and down directions.

7. The apparatus of claim 5, wherein in the first mode of operation, the first, second, third, and fourth signals respectively are signals for incrementing a channel selection, decrementing a channel selection, increasing a volume setting, and decreasing a volume setting.

8. The apparatus of claim 1, wherein the apparatus is a digital television.

9. The apparatus of claim 8, wherein the first signal causes a pointer to traverse a graphical user interface presented on the digital television in a first direction.

10. The apparatus of claim 8, wherein the first signal activates one of the following functions: incrementing a channel selection, decrementing a channel selection, increasing a volume setting, and decreasing a volume setting.

11. The apparatus of claim 8, further comprising a mode button that enables the user to switch between the first mode of operation and the second mode of operation.

12. The apparatus of claim 8, wherein the optical elements are bi-color light emitting diodes.

13. A method for use in a digital television, the method comprising:
(a) setting a first mode for a button arrangement including a plurality of buttons;
(b) causing a first color to be displayed on the button arrangement, wherein in the first mode the button arrangement is used to provide at least first, second, third, and fourth control functions;
(c) setting the button arrangement to a second mode; and
(d) causing at least four different colors to be displayed on the plurality of buttons of the button arrangement, such that each of the plurality of buttons is associated with a different one of the at least four colors; wherein in the second mode the plurality of buttons when activated respectively select predefined links displayed on the digital television having same colors, wherein when any combination of the predefined links are displayed a corresponding combination of the plurality of buttons are activated to display the respective colors of the predefined links, whereby buttons associated with any of the colors corresponding to the predefined links not displayed are not activated.

14. The method of claim 13, wherein the first, second, third, and fourth control functions are to traverse a graphical user interface presented on the digital television.

15. The method of claim 13, wherein the first, second, third, and fourth control functions are respectively incrementing a channel selection, decrementing a channel selection, increasing a volume setting, and decreasing a volume setting.

16. The method of claim 13, wherein the digital television comprises a button having at least two states, one state associated with the first mode and the second state associated with the second mode and further comprising the step of determining the state of the button such that when the state associated with the first mode is detected steps (a) and (b) are performed and when the state associated with the second mode is detected steps (c) and (d) are performed.

17. The method of claim 13, further comprising the step of:
(e) returning to step (a) upon selection of a button by a user.

18. The method of claim 13, wherein the four different colors are red, green, blue and yellow.

19. The method of claim 18, wherein the first color is white.

\* \* \* \* \*